United States Patent
Benson

(10) Patent No.: US 8,962,791 B2
(45) Date of Patent: Feb. 24, 2015

(54) POLYLACTIC ACID STEREOCOMPLEX COMPOSITIONS AND METHODS FOR MAKING AND USING SAME

(75) Inventor: Richard Douglas Benson, Long Lake, MN (US)

(73) Assignee: NatureWorks LLC, Minnetonka, MN (US)

( * ) Notice: Subject to any disclaimer, the term of this patent is extended or adjusted under 35 U.S.C. 154(b) by 1310 days.

(21) Appl. No.: 12/445,288

(22) PCT Filed: Oct. 24, 2007

(86) PCT No.: PCT/US2007/022501
§ 371 (c)(1),
(2), (4) Date: Mar. 2, 2010

(87) PCT Pub. No.: WO2008/057214
PCT Pub. Date: May 15, 2008

(65) Prior Publication Data
US 2010/0152415 A1    Jun. 17, 2010

(51) Int. Cl.
| | | |
|---|---|---|
| *C08G 63/08* | (2006.01) | |
| *C08L 67/04* | (2006.01) | |
| *B29C 47/00* | (2006.01) | |
| *B29C 51/00* | (2006.01) | |
| *B29C 51/02* | (2006.01) | |
| *B29C 47/88* | (2006.01) | |
| *B29K 67/00* | (2006.01) | |
| *C08L 25/14* | (2006.01) | |

(52) U.S. Cl.
CPC ............ *C08L 67/04* (2013.01); *B29C 47/0021* (2013.01); *B29C 51/002* (2013.01); *B29C 51/02* (2013.01); *B29C 47/8815* (2013.01); *B29K 2067/046* (2013.01); *B29K 2995/0017* (2013.01); *B29K 2995/004* (2013.01); *B29K 2995/006* (2013.01); *C08L 25/14* (2013.01); *C08L 2205/02* (2013.01)
USPC ........................................................ 528/354

(58) Field of Classification Search
USPC .................... 528/354; 264/210, 316
See application file for complete search history.

(56) References Cited

U.S. PATENT DOCUMENTS

| | | |
|---|---|---|
| 4,719,246 A | 1/1988 | Murdoch et al. |
| 4,766,182 A | 8/1988 | Murdoch et al. |
| 4,800,219 A | 1/1989 | Murdoch et al. |
| 4,902,515 A | 2/1990 | Loomis |
| 4,981,696 A | 1/1991 | Loomis |
| 5,317,064 A | 5/1994 | Spinu |
| 6,323,307 B1 | 11/2001 | Bigg |
| 6,495,631 B1 | 12/2002 | Randall et al. |
| 2003/0038405 A1 | 2/2003 | Bopp et al. |
| 2004/0242803 A1* | 12/2004 | Ohme et al. .................. 525/400 |
| 2005/0001358 A1 | 1/2005 | Nakazawa et al. |
| 2006/0177674 A1 | 8/2006 | Aritake et al. |

* cited by examiner

*Primary Examiner* — Ling Choi
*Assistant Examiner* — Thuy-Ai Nguyen
(74) *Attorney, Agent, or Firm* — Gary C Cohn PLLC

(57) ABSTRACT

Thermoformed PLA stereocomplex parts are made using a PLA stereocomplex composition having a highest crystallization melting temperature from 200 to 215° C. The stereocomplex composition preferably has less than 5 J/g of lower melting (160 to 190° C.) crystallites. The stereocomplex can be pre-annealed in various ways to reduce thermoforming cycle times. The stereocomplex forms parts with low haze and good thermal resistance, at reasonable cycle times.

12 Claims, No Drawings

POLYLACTIC ACID STEREOCOMPLEX COMPOSITIONS AND METHODS FOR MAKING AND USING SAME

This application claims priority from U.S. Provisional Application No. 60/854,645, filed 26 Oct. 2006.

This invention relates to a thermoforming process for making articles from polylactide resins.

Polylactide resins (also known as polylactic acid, or PLA), are now available commercially. These resins can be produced from annually renewable resources such as corn, rice or other sugar- or starch-producing plants. In addition, PLA resins are compostable. For these reasons, there is significant interest in substituting PLA into applications in which oil-based thermoplastic materials have conventionally been used. To this end, PLA has been implemented into various applications such as fibers for woven and nonwoven applications, containers such as water bottles, and a variety of thermoformed articles such as deli trays, cups, and other food packaging applications.

A problem with PLA resins is that they usually have low resistance to heat. PLA resins generally exhibit a glass transition temperature ($T_g$) in the range from 60 to 66° C. PLA articles tend to become distorted when exposed to temperatures above the $T_g$. This makes PLA resins generally less suitable for applications such as for handling hot foods or for microwavable packaging applications. The low heat distortion temperature can even cause problems in transporting and storing thermoformed PLA articles. During summer months, temperatures inside of transportation vehicles can easily exceed the glass transition temperature of the PLA resins. Stacked articles such as cups and deli trays can soften slightly under those conditions, causing them to stick together in a phenomenon known as "blocking".

Somewhat better high temperature performance can be obtained by introducing crystallinity into the polymer. Certain PLA resins are semi-crystalline materials, forming a crystalline phase having a melting temperature of about 160-190° C. These resins are usually characterized as having a very high proportion of one of the lactic acid enantiomers or the other. Because lactic acid contains a chiral carbon atom, it exists in both D- (R-) and L- (S-) forms. Polymers in which the D- or the L-form constitutes at least about 90% of the repeating units can form semi-crystalline articles. A PLA resin containing at least 90% D-repeating units is referred to herein as a "high-D" PLA resin, while one containing at least 90% L-repeating units is referred to herein as a "high-L" PLA resin. PLA resins that are more optically pure (i.e., those that contain even a higher proportion of the dominant enantiomer) tend to form semi-crystalline articles more readily.

The use of a high D or high L resin makes it possible in principle to improve the heat properties of PLA articles somewhat, if enough of the higher-melting crystallites are formed as the article is fabricated. In practice, this approach has proved unsatisfactory, for at least two reasons. The first reason is that processing conditions must be tightly controlled in order to obtain the necessary crystallization on a repeatable basis. This leads to small operating windows and often requires reduced operating rates. Each of these factors leads to high processing costs. The second reason is that highly crystalline PLA resins tend to become opaque. Many applications, especially food packaging applications, demand that the resin remain clear and aesthetically attractive. It has proven to be quite difficult to produce clear thermoformed PLA articles that have good thermal properties, at acceptable production rates.

Mixtures of high-D and high-L PLA resins are known to form a crystalline structure that is known as a "stereocomplex". The stereocomplex exhibits a crystalline melting temperature as much as 60° C. higher than that of the high D- or high L-resin by itself. In principle, the heat resistance of a PLA article can be increased quite significantly if these stereocomplex crystallites are present in sufficient quantities.

The reality is that no methods have been developed by which stereocomplex-containing PLA articles can be produced rapidly and economically. For this reason, there have been no commercial applications for these materials despite the fact that these materials and their thermal characteristics have been known since at least the late 1980's.

The main obstacles to the commercial development of stereocomplexes are their high melting temperatures and the slow rate at which the stereocomplex crystals form. PLA resins tend to degrade rapidly at temperatures needed to melt the stereocomplex crystallites. This makes it difficult to melt-process the materials. As a result, research scale methods typically form the stereocomplex from solution so that lower temperatures can be used and less polymer degradation is seen. This is an unsatisfactory approach from the standpoint of commercial production, as the use of solvents increases costs, adds much complexity to the process, and raises concerns about worker exposure to volatile organic materials. Melt processing methods are needed to make stereocomplex parts economically on a large scale.

Melt processing of PLA stereocomplexes is also hampered because the resins tend to form stereocomplex crystals rather slowly. The slow rate of stereocomplex crystallite formation adds to the processing time, thereby lowering production rates and increasing costs.

It would therefore be desirable to provide a method by which clear, thermoformed PLA articles having better thermal properties can be produced. It would be further desirable if such method allows for reasonably short cycle times, so that the articles can be produced economically. It would be desirable, too, if the method could be practiced on commercially available equipment of the type that is generally used to produce similar types of articles, with minimal or no modifications.

In one aspect this invention is a process comprising heating a sheet of a PLA resin that exhibits a crystallization half-time of less than 3 minutes as measured by differential scanning calorimetry at 130° C., to a temperature between the glass transition temperature of the PLA resin and the highest crystalline melting temperature of the PLA resin, and thermoforming the heated sheet on a mold to form a thermoformed article, wherein the PLA thermoformed article contains from 20 to 60 Joules per gram of PLA resin in the thermoformed article of PLA crystallites having a highest crystalline melting temperature of 200 to 215° C.

In another aspect, this invention is a process comprising
a) forming a mixture of PLA resins in which a high D PLA resin constitutes from 25 to 75% by weight of the weight of the PLA resins and a high L PLA resin constitutes from 75 to 25% by weight of the PLA resins, and heating the mixture to a temperature above its highest crystalline melting temperature for a period of from about 5 minutes to 3 hours; then
b) extruding the mixture to form a thermoformable sheet, and
c) thermoforming the sheet.

In another aspect, this invention is a process comprising
a) forming a mixture of PLA resins in which a high D PLA resin constitutes from 25 to 75% by weight of the weight of the PLA resins and a high L PLA resin constitutes from 75 to 25% by weight of the PLA resins, and heating the mixture to a temperature above its highest crystalline melting temperature for a period of from about 5 minutes to 3 hours; then b) extruding the mixture to form a thermoformable sheet, c) heating the sheet to a temperature above its glass transition temperature but below 180° C. for a period of time sufficient to produce a semi-crystalline sheet having from 15 to 40 J/g of crystallites that have a melting temperature of from 200 to 215° C. and then d) thermoforming the sheet.

The thermoforming processes of the invention provide means by which clear PLA thermoformed articles can be made at an economical rate, using readily available thermoforming equipment. The PLA articles have good thermal properties. In particular, the thermoformed PLA articles exhibit excellent resistance to temperatures of 65° C. or even higher. As a result, they are readily transported with reduced tendency to block, and can be used in certain hot food applications for which other thermoformed PLA articles are unsuitable because they have inadequate heat resistance.

This invention is also a thermoformable sheet having a thickness of from 5 to 50 mils, the sheet being formed from a PLA resin having a highest crystalline melting temperature of 200 to 215° C. and a crystallization half-time of less than 3 minutes as measured by differential scanning at 130° C.

The thermoformable sheet is readily thermoformed into a variety of shaped articles. Enough crystallization due to stereocomplex formation can be achieved during the thermoforming process to impart good heat resistance to the thermoformed articles. As discussed in more detail below, the extent and speed of stereocomplex formation can be augmented by heat-annealing the sheet prior to or during the thermoforming process. A surprising and desirable characteristic of the sheet of the invention is that it can be thermoformed into clear parts having good heat resistance.

In yet another aspect, this invention is a thermoformed article having at least one layer of a poly(lactide) resin, the layer of poly(lactide) resin having crystallites having a melting temperature of from 200-215° C., a total crystallinity of at least 25 J/g of poly(lactide) resin and less than 5 J per gram of polylactide resin of crystallites having a crystalline melting temperature of from 160 to 190° C.

The invention is also a method of making a PLA stereocomplex, comprising melt blending a high D-polylactide and a high L polylactide in the presence of a chain coupling agent.

The PLA resin used in this invention is formed from at least two starting PLA resins, one of which is a high-D resin and one of which is a high-L resin. For the purposes of this invention, the terms "polylactide", "polylactic acid" and "PLA" are used interchangeably to denote polymers having repeating units of the structure —OC(O)CH(CH$_3$)—. The PLA resin preferably contains at least 90%, such as at least 95% or at least 98% by weight of those repeating units. These polymers are readily produced by polymerizing lactic acid or, more preferably, by polymerizing lactide.

Lactic acid exists in two enantiomeric forms, the so-called "L-" and "D-" forms. The —OC(O)CH(CH$_3$)— units produced by polymerizing lactic acid or lactic retain the chirality of the lactic acid. A PLA resin will therefore contain, in polymerized form, a mixture of both the "L" and the "D" enantiomers. In this invention, a mixture of a "high-D" and a "high-L" PLA resin is used to form the PLA resin that is to be thermoformed. A "high-D" PLA starting resin is one in which the D-enantiomer constitutes at least 90% of the polymerized lactic acid repeating units in the polymer. The high-D starting resin preferably contains at least 95% of the polymerized D-enantiomer. The high-D starting resin may contain essentially 100% of the polymerized D-enantiomer. The high-D starting resin more preferably contains at least 95.5% of the polymerized D-enantiomer, and most preferably contains from 95.5 to 99% of the polymerized D-enantiomer.

Similarly, a high-L starting resin is one in which the L-enantiomer constitutes at least 90% of the polymerized lactic acid repeating units in the polymer. It preferably contains at least 95% of the polymerized L-enantiomer. The high-L starting resin may contain essentially 100% of the polymerized L-enantiomer. The high-L starting resin more preferably contains at least 95.5% of the polymerized L-enantiomer, and most preferably contains from 95.5 to 99% of the polymerized L-enantiomer.

The high-D and high-L PLA starting resins have molecular weights that are high enough for melt processing applications. A number average molecular weight in the range of 20,000 to 150,000, as measured by gel permeation chromatography against a polystyrene standard, is generally suitable, although somewhat higher and lower values can be used in some circumstances. The molecular weight of the high-D and high-L starting resins may be similar to each other (such as a number average molecular weight difference of 20,000 or less). It is also possible that the molecular weights of the high-D and high-L starting resins differ by a larger amount.

The starting PLA resins may further contain repeating units derived from other monomers that are copolymerizable with lactide or lactic acid, such as alkylene oxides (including ethylene oxide, propylene oxide, butylene oxide, tetramethylene oxide, and the like) or cyclic lactones or carbonates. Repeating units derived from these other monomers can be present in block and/or random arrangements. Such other repeating units preferably constitute from 0 to 5% by weight of the PLA resin, if present at all. The starting PLA resins are most preferably essentially devoid of such other repeating units.

The starting PLA resins may also contain residues of an initiator compound, which is often used during the polymerization process to provide control over molecular weight. Suitable such initiators include, for example, water, alcohols, glycol ethers, polyhydroxy compounds of various types (such as ethylene glycol, propylene glycol, polyethylene glycol, polypropylene glycol, glycerine, trimethylolpropane, pentaerythritol, hydroxyl-terminated butadiene polymers and the like). A compound having at least one hydroxyl group and at least one carboxyl group, such as lactic acid or a lactic acid oligomer, is also suitable. The initiator residue preferably constitutes no more than 5%, especially no more than 2%, of the weight of the starting PLA resin, except when the initiator lactic acid or a lactic acid oligomer.

A particularly suitable process for preparing the starting PLA resins by polymerizing lactide is described in U.S. Pat. Nos. 5,247,059, 5,258,488 and 5,274,073. This preferred polymerization process typically includes a devolatilization step during which the free lactide content of the polymer is reduced, preferably to less than 1% by weight, more preferably less than 0.5% by weight and especially less than 0.2% by weight. The polymerization catalyst may be deactivated, but it is within the scope of the invention to use a starting PLA resin (or resins) that contain active catalyst or catalyst residues.

The PLA resin to be thermoformed in this invention is made by first melt blending a high-D and a high-L PLA resin. The proportions of the high-D and high-L starting resins can range from 25:75 to 75:25 by weight during this step. Preferably, the proportions of high-D and high-L resins during this step are from 40:60 to 60:40, and more preferably are from 45:55 to 55:55. Approximately equal quantities by weight are most preferably used in this step.

The high-L and high-D starting resins will form stereocomplex crystallites when melt blended. Stereocomplex crystallites formed from simple melt blending of high-L and high-D resins typically exhibit crystalline melting temperatures in the range of from 220 to 230° C. In this invention, this crystalline melting temperature is reduced by heating the melt-blended starting resins to a temperature above its highest crystalline melting temperature for a period of time. This additional heating will reduce the highest crystalline melting temperature of the blended resins. Heating is continued for a period of time sufficient to reduce the highest crystalline melting temperature to a maximum of 200 to 215° C. A heating time of about 5 minutes to 3 hours at these temperatures is generally sufficient. This heating step can be performed immediately after the melt blending step in a single operation, or may be performed in a separate step at some later time. A temperature of from 225 to 300° C. can be used; 230 to 250° C. is particularly suitable. The melt blending and heating steps may be performed under a vacuum to remove any lactide that is formed during the process.

The heating step is preferably conducted in the presence of a catalyst that promotes the transesterification reaction. Suitable catalysts include various metallic catalysts, including a variety of tin, zinc, manganese, antimony, titanium and germanium catalysts. The catalyst may be the same catalyst (or residues thereof) as is used to prepare either or both of the starting PLA resins. In one embodiment of the invention, one or both of the starting PLA resins used in the blending and heating step contains active catalyst or residues from its polymerization, and that catalyst or catalyst residue functions as a catalyst in the transesterification reaction. In such an embodiment, the catalyst is not deactivated in at least one of the starting PLA resins prior to introducing that PLA resin into the blending and heating steps.

Crystallization melting temperatures are determined for purposes of this invention by differential scanning calorimetry (DSC). The sample (6-10 mg) is heated to 250° C. and held at that temperature long enough to melt out all crystallites. The sample is then cooled to 130° C. at 50° C./minute or faster and then held at 130° C. to allow crystallites to form. It is then heated at 50° C./minute and the crystalline melting temperature(s) determined. Crystalline melting temperature is defined as the temperature of the endothermic peak center under melt-out.

Although this invention is not limited by any theory, it is believed that the reduction in the highest crystalline melting temperature that occurs when the blend is heated is due to certain transesterification reactions that occur between the high-D and high-L resins. Under high temperature conditions, transesterification will occur, resulting in the formation of block or multi-block copolymers having segments of the L-enantiomer and segments of the D-enantiomer. As heating continues, these transesterification events will continue to occur, producing block copolymers in which the average segment length of L- or D-enantiomer blocks becomes progressively smaller, until the segment length becomes so short that stereocomplex formation is no longer possible. It is believed that during the early stages of transesterification, the segments of the block copolymers that are formed contain a high proportion of L-segments and D-segments, each having a length of about 5 to about 20 monomer units. It is further believed that stereocomplex crystallites formed from those block copolymers are somewhat imperfect, compared to stereocomplex crystallites formed from the homopolymers, leading to their lower crystalline melting temperature. For these reasons, a heat-treated PLA resin that exhibits a highest crystalline melting temperature of from 200 to 215° C. is referred to for convenience herein as a "transesterified PLA resin".

It is further believed that the block copolymers having a high proportion of L- and D-segments of about 5 to 20 monomer units in length are capable of engaging in intramolecular as well as intermolecular stereocomplex formation. That is, an L-segment of the block copolymer is capable of aligning with a D-segment of the same molecule, or one of another molecule, and forming a stereocomplex crystallite with that D-segment.

It is preferred that from about 30 to about 88%, especially from about 40 to about 80%, by weight of the PLA resin is made up of L- or D-segments of about 5 or more monomer units in length. These segments preferably have a length of from 5 to 15 and especially from 5 to 12 monomer units. The remainder of the PLA resin will consist mainly of shorter segments having fewer than 5 consecutive D- or L-enantiomers.

The transesterified PLA resin is further characterized in having a crystallization half-time of less than 3 minutes at 130° C. "Crystallization half-time" is determined by DSC, and provides an indication of crystallization rates for a PLA resin. The sample is melted at 250° C. for a period long enough to melt out all crystallinity (~3 minutes for a 6-10 mg sample), and then cooled at 50° C./minute or faster to 130° C. The sample is held at 130° C. and allowed to crystallize at that temperature until no further crystals develop. The enthalpy of crystallization is tracked as a function of time. The time required to develop one-half of the final crystallinity is the crystallization half-time. The sample is then heated at 250° C. to melt out the crystallites and so determine the melting temperature of the crystallites that have formed. The transesterified PLA resin often exhibits a crystallization half-time of less than 3 minutes, more typically from about 15 seconds to three minutes. In general, shorter crystallization half-times are preferred. The crystallization half-time may be from 15 seconds to 1.5 minutes.

The ability of the transesterified PLA resin to participate in intra-molecular stereocomplex formation is believed to account, at least in part, for the higher crystallization rates that often seen with this invention than can be seen with conventional stereocomplex compositions.

The transesterified PLA resin preferably is crystallizable to form from 20 to 60 Joules/gram of crystallites having a highest crystalline melting temperature of 200 to 215° C. This property is evaluated by heating the transesterified PLA resin to 250° C. or higher for sufficient time to melt out all crystallites, then cooling at 50° C./minute to 130° C. and holding the sample at that temperature for 10 minutes. The sample is then heated at 50° C./minute to 250° C. and the enthalpy of crystallite melting is measured across the temperature range of 200 to 215° C.

The transesterification conditions tend to lead to a certain amount of molecular weight degradation in the PLA resins. To ameliorate the effects of this degradation, a chain coupling agent may be present during the blending and/or heat treating steps. PLA resins tend to have hydroxyl and/or carboxyl terminal groups. Therefore, suitable chain coupling agents are compounds that have two or more functional groups that each are capable of reacting with a hydroxyl or carbonyl group to form a covalent bond thereto. Examples of chain coupling agents include those having two or more epoxy, anhydride, oxazoline, isocyanate, carbodiimide, hydroxyl, tertiary phosphate, phthalimide or similar groups/molecule. In instances where the chain coupling agent has more than two such functional groups/molecule, it also will tend to function as a branching agent. A particularly preferred type of chain coupling agent is an acrylic polymer or copolymer containing multiple epoxy groups. Examples of such polymers and copolymers are commercially available from Johnson Polymers, Inc. under the trade name Joncryl® 4368 and 4369.

A sufficient quantity of the chain coupling agent is used so that the number average molecular weight of the blend is within the ranges described above with respect to the individual PLA resin starting materials. The amount of chain coupling agent required to accomplish this will depend on its equivalent weight/functional group and the number of functional groups/molecule. Small amounts, such as from 0.1 to about 5% by weight, based on the weight of the PLA resin starting materials, are usually sufficient to provide the requisite chain coupling. The blend advantageously exhibits a relative viscosity of about 2.0 to about 4.5, especially from 2.5 to about 4.2 as measured in methylene chloride at 30° C.

In order to produce a melt-stable lactide polymer, it is preferred to remove or deactivate the catalyst (if used) at the end of the transesterification process. This can be done by precipitating the catalyst or preferably by adding an effective amount of a deactivating agent to the polymer. Catalyst deactivation is suitably preformed by adding a deactivating agent to the polymer, preferably prior to the devolatilization step. Suitable deactivating agents include carboxylic acids, of which polyacrylic acid is preferred; hindered alkyl, aryl and phenolic hydrazides; amides of aliphatic and aromatic mono- and dicarboxylic acids; cyclic amides, hydrazones and bishydrazones of aliphatic and aromatic aldehydes, hydrazides of aliphatic and aromatic mono- and dicarboxylic acids, bis-acylated hydrazine derivatives, phosphite compounds and heterocyclic compounds.

It is also preferred to devolatilize the transesterified polymer to reduce the lactide levels as described before with respect to the starting PLA resins.

The transesterified PLA resin may be blended with an additional quantity of a PLA resin, during or after the heat treating step. The additional PLA resin may be the same or different from those used to form the stereocomplex in the first step, but is preferably a high-L PLA resin or high-D PLA resin. The optical purity of this added PLA resin can affect crystallization rates of the blended product, with crystallization rates generally decreasing with decreasing optical purity of the additional PLA. The additional PLA resin preferably contains at least 93% and more preferably at least 95.5% of the predominant enantiomer. The predominant enantiomer most preferably constitutes from 95.5 to 99% by weight of the polymerized lactic acid enantiomers in the additional PLA resin.

When additional PLA resin is added in this manner, the proportions of the PLA resins used to make the blend (starting PLA resins plus additional PLA resin) are such that a high-D resin and high-L resin each constitutes at least 25% of the resins used to make the blend.

When an excess of a high-D PLA resin is used, compared to the weight of the high-L PLA resin, or an excess of a high-L PLA resin is used compared to the weight of the high-D resin, at least a portion of the high-D or high-L PLA resin that is in excess will not form into stereocomplex domains. This "free PLA" may be crystallizable by itself to form separate crystallites having a crystalline melting temperature of from 160 to 190° C. These lower-melting crystallites are believed to be due to the crystallization of the excess high-D or high-L resin by itself. It is preferred that the transesterified PLA resin is crystallizable to form little or no such low-melting crystallites. In particular, it is preferred that the transesterified PLA resin can not form crystallize to more than 10 J/g, more preferably not more than 5 J/g, of such low-melting crystallites. The ability for the transesterified PLA resin to crystallize to form low-melting crystallizes is measured in the same manner as described before, with the enthalpy of crystallite melting being measured across the temperature range of 160° to 190° C.

The transesterified PLA is crystallizable as described before, but the actual level of crystallinity of any particular sample of the transesterified PLA resin will depend on its thermal history. Crystallization of the transesterified stereocomplex and stereocomplex/PLA blends of the invention can be induced by heating to a temperature above the glass transition temperature but below the stereocomplex crystalline melting temperature. A suitable temperature range is from about 80 to about 160° C., and a preferred crystallization temperature range is from about 110 to about 150° C. The time at which the sample is held at such temperatures also influences the crystallinity of the sample, with longer times at those temperatures usually correlating to higher crystallinity levels, until such time as crystallinity is fully developed. The developed crystallinity can be fixed at any desired level by cooling (or "quenching") the transesterified PLA resin to below its glass transition temperature once the desired level of crystallinity has been obtained. Crystallinity is destroyed by heating the sample to a temperature higher than the crystalline melting temperature.

In most cases, the transesterified PLA resin will be formed as a particulate material, such as particles or pellets having a particle size in the range of 0.5 to 1000 microns. Typically, such a particulate will be formed by cooling the transesterified PLA resin quickly from the heat-treating temperature to below its $T_g$, followed by cutting or grinding to form particles or pellets. In such a case, the transesterified PLA resin may experience little time at the crystallization temperature and thus develop little or no crystallinity. If desired, the products of the invention may be partially crystallized while in particulate form. This has the advantage of reducing the tendency of the particles to stick to each other during packaging and transportation. This crystallinity will be lost as the particles are later melt-processed into a sheet for thermoforming. Therefore, the crystallinity of the transesterified PLA resin prior to use in the thermoforming process is not important, because the crystallinity of the starting material will be destroyed when the resin is melt-processed and the crystallinity will need to be induced again as it is formed into a thermoformed part.

Crystallization half-times can be further decreased when certain additives are incorporated into the transesterified PLA product. Additives that help in this regard include plasticizers and nucleation aids. However, it has been found that some types of plasticizers and nucleation aids tend to promote the formation of the less-desired lower melting crystallites, rather than the higher-melting stereocomplex crystallites. A suitable type of additive is a combination of a metal phosphate and a basic inorganic aluminum compound, each of which can be used in an amount of from about 0.01 to about 5 parts per 100 parts of the PLA product. Such combinations of metal phosphate and basic inorganic aluminum compound are described in more detail in U.S. Published Patent Application 2005/0001358. Other suitable types of nucleating agents include aromatic amides as described in JP 2005-042084A, aromatic ureas as described in WO 2005/63885A, and oxamide or isocyanuric acid derivatives as described in JP 2005-255806A.

Other useful additives include nucleants, other inorganic fillers, plasticizers, reinforcing agents, slip agents, lubricants, UV-stabilizers, thermal stabilizers, flame retardants, foaming agents, antistatic agents, antioxidants, colorants, and the like, as well as combinations of these types of materials.

The transesterified PLA resin is thermoformed by first forming it into a sheet and then drawing the sheet into a mold. The sheet can be formed by extruding the transesterified PLA resin, either as it is made or in a separate step. A sheet having a thickness of about 5 to about 50 mils, especially from 10 to 30 mils, is generally suitable for most thermoforming applications. The sheet is extruded by heating the transesterified PLA resin to above its highest crystalline melting temperature to fully melt out the crystallites, and then extruding the melt though a suitable die. The sheet may be stretched or rolled post-extrusion to adjust its dimensions, particularly its thickness.

The sheet is thermoformed by bringing it to a temperature somewhat above its glass transition temperature but below the stereocomplex crystalline melting temperature to soften it, positioning the softened sheet over a male or female mold, and drawing and/or pressure forming the sheet on the mold to form a molded part. The mold is most typically a female mold. The sheet is suitably heated to a temperature from about 100° C. to about 160° C. and especially from about 125° C. to about 150° C. in the softening step. Multiple formed parts can be made simultaneously or sequentially from a single sheet. The mold may be heated to a temperature above the glass transition temperature but below the crystalline melting temperature of the sheet (such as from 80 to 160° C., especially from 80 to 140° C.). It is also possible to use a "cold" mold which is at or below the glass transition temperature of the resin. The process of this invention can be conducted using conventional types of thermoforming apparatus. Examples of such apparatus and general methods are described, for example, by Throne in "Thermoforming Crystallizing Poly (ethylene Terephthalate) (CPET)", *Advances in Polymer Technology*, Vol. 8, 131-146 (1988). Drawing is preferably performed using vacuum. The mold may include a male half that is inserted into the female half during the process to provide male mold forming. It may also be desirable to pre-stretch the sheet; if so, a pressure cap or other prestretching device may be used and actuated prior to drawing the sheet into the mold. Once the part is formed and cooled below its $T_g$, it is demolded and separated from other parts and trimmed if necessary. Various downstream operations, such as applying graphics or labels, assembly to other parts, packaging and the like can be performed if needed, depending on the type of part and its intended use.

Desirable thermal properties are obtained by developing suitable levels of crystallinity in the thermoformed part. A thermoformed part made in accordance with the invention preferably has a crystallinity of from 20 to 60, especially from 25 to 45 Joules/gram, of crystallites that have a melting temperature of from 200 to 215° C. Lower-melting crystallites that are associated with the individual PLA resins are most preferably not present, or if present, represent no more than about 5 Joules/gram) of the crystallinity of the part.

In general, crystallinity will develop within the sheet or part (in the heat-softening and/or during the thermoforming step) during such time as the sheet or part is maintained at a temperature between its glass transition and highest crystalline melting temperatures, as discussed before. Therefore, crystallinity can be introduced into the sheet at several steps in the process.

In one variation of the process, the sheet is heated in the softening step, maintained at the crystallization temperatures for a period of time sufficient to develop the desired level of crystallinity, and then thermoformed.

In a second approach, the sheet is heated and softened, then formed on a mold, and maintained within the aforementioned temperature range while on the mold for a time sufficient to induce the desired level (and type) of crystallinity.

In either of these two approaches, the sheet and/or part is preferably maintained at the crystallization temperature for a period of about 1 to about 5 minutes, unless the sheet is pre-annealed.

Pre-annealing is done by heating the sheet to a temperature between the glass transition and highest crystalline melting temperature for a relatively short period of time, prior to heat-softening the sheet for the thermoforming step. The pre-annealing can be done, for instance, immediately after extruding the sheet, by cooling in the sheet to within the needed temperature range and holding it at that temperature for a short time. Alternatively, the sheet can be quenched after extrusion and pre-annealed in a separate heating step.

A preferred temperature range for the pre-annealing step is from about 90 to 140° C., although higher temperatures can be used. A time of about 15 seconds to 5 minutes, preferably from 20 to 90 seconds, is useful, although longer times are preferably used in conjunction with the lower end of the temperature range. An especially preferred temperature for pre-annealing step is from 90 to 120° C. The lower temperatures within the especially preferred range provide for better process control in the pre-annealing step, as described more fully in Example 3 below.

Pre-annealing can substantially increase the rate at which the sheet crystallizes, even in cases in which little or no measurable crystallization occurs during the pre-annealing step. It is believed that a certain amount of crystallite nucleation occurs during the pre-annealing step, which leads to the increased crystallization rate, even when the pre-annealed sheet contains 15 J/g or less of crystallinity or even less than 5 J/g of crystallinity. When a pre-annealed sheet is used in the thermoforming process, the time required at the crystallization temperature during the heat-softening and thermoforming steps is often reduced to less than 2 minutes, such as from about 30 seconds to about 1.75 minutes. This significantly reduces cycle time in the thermoforming process, as time required during the heating step, the in-mold residence time (when a heated mold is used) or both can be significantly reduced.

It is also possible to develop a higher level of crystallinity in the preannealing step, if desired.

When the sheet is pre-annealed, the heat-softening step of the thermoforming process may be (and preferably is) done at a higher temperature than was used in the pre-annealing step. When the sheet is pre-annealed at the preferred temperature of from 90 to 120° C., the heat-softening step is preferably conducted at a higher temperature of from 121 to 150° C.

In a third approach to thermoforming, the sheet is fully crystallized prior to the heat-softening step, so little or no time is required at the crystallization temperature to develop the requisite crystallinity in the thermoformed part. Once the requisite level of crystallinity is developed in the sheet, it may be quenched by cooling it below its glass transition temperature. The quenched sheet can then be used in a separate thermoforming step, which can be conducted at any later time. Alternatively, the crystallized sheet can be fed directly into a thermoforming step without quenching.

It is also possible to generate the needed crystallinity using some combination of these approaches.

In all three approaches, it is preferred that the crystallinity in the sheet not exceed about 45, especially about 40 J/g, prior to thermoforming. Sheets having a higher degree of crystallinity can be too viscous at the forming temperatures to be easily formed.

Regardless of the particular approach to preparing the sheet for thermoforming, softening is performed such that the sheet can be thermoformed under commercially reasonable conditions, without softening the sheet so much that it is too fluid to transfer to the thermoforming mold and be formed into a part.

It is anticipated that as a matter of practice, heating conditions will be established empirically with respect to the particular equipment and particular PLA sheet that is used. These empirically derived heating conditions may be developed by establishing suitable and/or optimal temperatures to which a particular PLA resin sheet should be heated, and then relating those temperatures to particular controllable processing conditions such as heating time, line speeds, heater and/or oven temperatures, power to be supplied to heating apparatus, and the like. Alternatively, heating conditions can be empirically derived by measuring the crystallinity of the heated PLA sheet while varying process parameters.

The heating and/or crystallization steps can be carried out in any convenient manner, such as with convection heating, radiant heating (using energy sources of various types, such as visible light, infrared radiation, microwave radiation, and the like), conductive heating (such as by passing the sheet over a heated surface or between heated surfaces such as heated rollers) and induction heating. In order to keep cycle times short, heating is preferably done quickly and uniformly without scorching the sheet or forming significant localized hot spots. The sheet is conveniently held in a clamping frame or other apparatus to give it physical support and to facilitate transfer in and out of the heater and/or to the subsequent forming step.

The steps of forming the sheet, developing crystallinity in the sheet and thermoforming the part can be performed in various combinations. If the sheet is to be crystallized in the mold, the sheet may be extruded and transferred to the mold without first bringing the temperature of the sheet below its $T_g$. In a variation of this approach, the sheet may be brought to a pre-annealing temperature, then to a softening/crystallization temperature and finally introduced into the mold, without bringing the sheet to a temperature below its $T_g$ until after it has been introduced into the mold. Processes of these types tend to have long cycle times, as the steps of extrusion, annealing and crystallization often take longer than the thermoforming and quenching steps.

Alternatively, the sheet may be extruded, optionally annealed and/or crystallized, and then quenched. This has the advantage of decoupling the extrusion process from the thermoforming process, so the thermoforming operating rates are not limited by the slower extrusion process. In processes of these types, the quenched sheet must be reheated to the thermoforming temperature prior to conducting the thermoforming step.

Once the part has been formed on the mold, and the requisite level of crystallinity has been developed, it is quenched by cooling the part to a temperature below its glass transition temperature. In cases in which the crystallinity is fully or nearly developed in the sheet prior to thermoforming, the sheet may be thermoformed on a mold that is at a temperature below the $T_g$ of the sheet, so that quenching occurs immediately or nearly immediately as the part is formed. When it is necessary to develop crystallinity in the mold, the mold will in most cases be preheated to a temperature above the glass transition temperature. In those cases, quenching can be performed while the part is in the mold, by cooling the mold. Alternatively, the part can be transferred to a second, cooler mold for quenching. It is also possible to quench the part by demolding it and cooling it outside of the mold.

Some additional stress-induced crystallinity may be introduced due to the orientation of the polymer during the thermoforming process but the amount is generally small.

The thermoforming step is preferably operated such that thermoforming cycle time (time to complete one thermoforming cycle and get ready to perform the subsequent cycle) is minimized. Thermoforming cycle times are advantageously less than 20 seconds, preferably less than 10 seconds, more preferably no more than 5 seconds, and even more preferably no more than 3 seconds.

Once the part is formed and cooled below its $T_g$, it is demolded and separated from other parts and trimmed if necessary. Various downstream operations, such as applying graphics or labels, assembly to other parts, packaging and the like can be performed if needed, depending on the type of part and its intended use.

The thermoformed parts are characterized by having good thermal properties together with low opacity.

Product clarity is often an important attribute of thermoformed parts. With conventional PLA resin materials, opacity tends to increase with increasing levels of crystallinity. The result is that when the part develops sufficient crystallinity to provide a level of heat stability, it becomes undesirably opaque. With this invention, thermoformed parts are readily prepared that have low haze, yet are sufficiently crystallized that they have good heat stability. Haze can be measured according to ASTM D1003-00 using a BYK Gardner Haze-Gard Plus instrument. % Haze is equal to 100%-% transmittance. For many applications, a haze value of 10% or less, and especially 6% or less is suitable, for a part thickness of 18 mils. Haze values for other part thicknesses are normalized to 18 mils for purposes of this invention. Haze measurements will typically include a contribution due to surface imperfections and irregularities, and another contribution due to the properties of the sample itself. The surface contribution to the haze measurements can be quite significant if the surface is very rough or irregular. Surface effects on the haze measurements can be minimized by testing parts having smooth surfaces. Another way to eliminate the surface contribution to haze measurements is to immerse or coat the sample with a liquid having approximately the same refractive index as the sample. Haze values reported herein are made using a sample with a smooth surface, such that the surface contribution to the haze measurement is small but not zero.

Preferred thermoformed parts will at the same time maintain their structural integrity at 65° C. Structural integrity at 65° C. can be evaluated using a heat-distortion temperature measurement. Duplicate thermoformed test samples are placed side by side in a preheated to (40° C.) oven with a viewing window. The oven is allowed to equilibrate back to 40° C., and the temperature is increased from 40° C. to 65° C. at a rate of 1° C./minute. The temperature at which visible distortion or shrinkage of the article first occurs is the heat distortion temperature. Linear shrinkage is measured on articles that exhibit visible distortion during the test. The articles preferably exhibit less than 2% shrinkage during the test, and more preferably exhibit no visible distortion.

In general, parts having 25 J/g or more, especially 30 J/g or more, of crystallites that melt between 200 and 215° C. and less than 5 J/g of lower-melting crystallites, especially less than 2 J/g of lower-melting crystallites, usually will meet both the haze and structural integrity criteria.

The following examples are provided to illustrate the invention but are not intended to limit the scope thereof. All parts and percentages are by weight unless otherwise indicated.

Example 1

Starting PLA resins for this example are a high-L PLA, which is a PLA homopolymer containing 95.5% of the L-enantiomer randomly polymerized with 4.5% of the D-enantiomer, and a high-D PLA, which is a PLA homopolymer containing 99% of the D-enantiomer and 1% of the L-enantiomer. The high-D resin contains from 70 to 80 ppm residual organotin polymerization catalyst. The catalyst used to make the high-L PLA is inactivated.

Equal weights of the high-L and high-D starting materials are melt blended in a twin-screw Leistritz compounder operating at a rate of 30 pounds/hour. The temperature in all heating zones is between 230° C. and 250° C. The approximate residence time in the compounder is 30 to 180 seconds. During this time, the starting resins are thoroughly melt blended and it is believed that they engage in transesterification reactions to form block copolymers having L-segments and D-segments. The extruded product exhibits a highest crystalline melting temperature of approximately 205° C. By varying the operating rate over the range from 20 to 40 pounds/hour, slight (±5° C.) variations in the crystalline melting temperature are seen. Crystalline half-times for the extruded product are consistently between 2.0 and 2.9 minutes and in most instances between 2.4 and 2.9 minutes.

A portion of the transesterified product from above is melt blended with an equal amount of a high-L PLA resin (95.5% L-enantiomer, 4.5% D-enantiomer), in the presence of 0.6 weight percent (based on the weight of the resins) of an epoxy-functional styrene-acrylate copolymer sold commercially as Joncryl 4300 (S. C. Johnson Polymers) and with a catalyst deactivating agent. The materials are dry-blended, and then compounded and pelletized using a twin-screw extruder. Crystalline melting temperature and crystallization half-time are determined for the resulting blend. Over the course of the run, the highest crystallization melting temperature ranges from about 205 to 212° C. and is mainly in the range of from 207 to 209° C. Crystalline half-times are less than 2.5 minutes for all products made during the run, and are mainly from about 1.8 to 2.1 minutes. The blend of the transesterified product and additional high-L PLA exhibits approximately the same melting temperature as the transesterified product alone, but has a significantly faster crystallization rate.

Additional blends are made from the transesterified product from Example 1 and the same high-L PLA resin at ratios of 30/70, 40/60, 60/40 and 70/30 by weight. In each instance, 0.8 weight percent of the Joncryl 4300 material is added, based on the weight of the transesterified product.

Example 2

A portion of the 50/50 blend from Example 1 is extruded into 18 mil sheet on a Rand-Castle 6-inch sheet line. The melt temperature of the polymer prior to sheet forming is approximately 230° C. Various portions of the resulting sheet are then subjected to various annealing conditions, to simulate conditions encountered in a thermoforming operation. The annealing experiments are done on a 4"×4" section of sheet, which is fixed in a frame so it retains its shape during the annealing process. Heating is done by placing the frame and sheet in an oven held at the specified temperature, for a predetermined period of time. The sheet is immediately quenched in ice water. Crystallization melting temperature, crystallization half-time, and haze are measured as described before.

Duplicate portions of the sheet are annealed at 130° C. for 1, 2, 3, 5 and 10 minutes, respectively. The sheet develops about 30 J/g of crystallinity after about 2 minutes and subsequently develops little more crystallinity. All of the crystallinity in each case is high-melting crystallinity attributed to stereocomplex crystallite formation.

The haze of the sheet at about 30% crystallinity is 9-10%.

Sheet is prepared and annealed in the same manner, using the 30/70, 40/60, 60/40 and 70/30 blends of transesterified product and additional high-L PLA resin described in Example 1. Sheet made using the 60/40 and 70/30 blends crystallize within 2 minutes to produce sheet having a crystallinity of about 36-38 J/g. All the crystallinity is the high melting type. Haze is 9-10% for the 60/40 blend, and 15-18% for the 70/30 blend.

Sheet made from the 30/70 and 40/60 blends crystallize more slowly and in the case of the 40/60 blend achieves a lower total level of crystallinity. Each produces about 20-25 J/g of high-melting crystallites after annealing for 10 minutes. However, each of these produces a significant level of lower-melting crystallites that are associated with the crystallization of the L-PLA resin alone. In the case of the 30/70 product, the lower-melting crystallites account for about 22 J/g of crystallinity. The lower-melting crystallinity correlates with higher haze for these materials. At about 30-32 J/g total crystallinity, these materials exhibit haze values of 15-20%.

These results indicate that blends containing ~40-60% stereocomplex and 60-40% excess high-L (or high-D) resin have particularly fast crystallization rates and produce products with especially low haze.

Example 3

In order to produce a thermoforming sheet which required a still lower time to crystallize, attempts are made to pre-anneal sheet made from the 50/50 blend of transesterified polymer and high-L PLA of Example 2. In this case, various sheet samples are assembled onto a frame as described in Example 3, and pre-annealed at 100° C. for 1, 3, 4, 5 or 10 minutes. The pre-annealed samples have about 4, 5, 6, 30, 28 and 32 J/g of high-melting crystallinity, respectively.

Duplicates of each of the pre-annealed samples are then heat-softened at 130° C. for various amounts of time, to determine the time needed to develop at least 30 J/g of crystallinity. The samples pre-annealed for 4, 5 and 10 minutes require less than 1 minute of heat-softening at 130° C. to develop over 30 J/g crystallinity, as those pre-annealed samples are already near or above those levels. The sample pre-annealed for 3 minutes develops about 35 J/g after 1.5 minutes of heat-softening at 130° C. The sample pre-annealed for 1 minute develops about 20 J/g crystallinity when heat-softened at 130° C. for 1.5 minutes, and about 35 J/g crystallinity when annealed at that temperature for 1.75 minutes. These results show that pre-annealing at 100° C. can reduce the time needed at a typical thermoforming temperature to develop the necessary crystallinity during the thermoforming process, even if the crystallinity of the pre-annealed sheet remains small. Pre-annealing can therefore shorten cycle times and/or heating requirements during the thermoforming process. It is believed that this pre-annealing creates a certain number of crystallite nucleation sites as well as developing some crystallinity.

In addition, pre-annealing at the somewhat lower temperatures as shown in this Example 4 permits more control over the development of nucleation sites and crystallinity, because these events occur more slowly at the lower temperatures. The slower rate of development makes the process less sensitive to the amount of time that the sheet is exposed to the pre-annealing temperature, thus creating more processing latitude.

Example 4

Equal amounts of high-L and high-D PLA resins are melt blended in a Helicone mixer/reactor. The starting resins are the same as described in Example 1. Duplicate runs are made, differing in that each mixture is held at the blend temperature of 240° C. for a different amount of time over that needed to simply mix and extrude the mixture. Crystallization half-times, highest crystalline melting temperatures and crystallinity (enthalpy of melting in J/g) are measured in each resulting sample. Results are as given in Table 1.

TABLE 1

| Additional Time at 240° C. | Stereocomplex Crystallites | | | Low-melting crystallites | | |
|---|---|---|---|---|---|---|
| | ½ time (min.) | M.T. (° C.) | Enthalpy (J/g) | ½ time (min.) | M.T. (° C.) | Enthalpy (J/g) |
| 0 minutes | 3.12 | 207 | 33 | N.D. | 151 | 5 |
| 15 minutes | 2.48 | 209 | 34 | N.D. | 169 | 11 |
| 30 minutes | 1.52 | 209 | 46 | N.D | 164 | 6 |
| 45 minutes | 1.47 | 209 | 43 | None | None | 0 |
| 52 minutes | 1.54 | 207 | 58 | None | None | 0 |

This data shows the effect of transesterification. As transesterification time increases up to about 45 minutes, the crystallization ½ time decreases, as does the amount of low-melting crystallites that form. At the same time, the level of stereocomplex crystallinity increases with increasing transesterification time. It is believed that the formation of block copolymers having L- and D-segments is responsible for the smaller crystallization times and the tendency to produce greater levels of stereocomplex crystallites.

When the blend that is transesterified for 52 minutes is blended with an equal amount of a PLA copolymer containing 88.5% L-enantiomer and 11.5% D-enantiomer, the crystallization half-time increases somewhat. This effect is believed to be due to the high D-content of the PLA copolymer. By itself, this PLA copolymer crystallizes only with difficulty. This result contrasts with that seen in Example 1, where blending the transesterified material with a 95.5% L-/4.5% D-copolymer reduces the crystallization half-time. This suggests that excess high-L or high-D PLA resin should be quite rich (such as 93% or more or 95.5% or more) in the predominant enantiomer in order to provide the effect of further reducing crystallization times in the blend.

It will be appreciated that many modifications can be made to the invention as described herein without departing from the spirit of the invention, the scope of which is defined by the appended claims.

What is claimed is:

1. A process comprising
   a) forming a mixture of starting PLA resins in which a high D PLA resin constitutes from 25 to 75% by weight of the weight of the PLA resins and a high L PLA resin constitutes from 75 to 25% by weight of the PLA resins, and heating the mixture to a temperature above its highest crystalline melting temperature for a period of from about 5 minutes to 3 hours in the presence of a transesterification catalyst, and then blending the resulting transesterified PLA resins with an additional quantity of a high L PLA resin or high D PLA resin to form a blend provided that the proportions of PLA resins, including the starting PLA resins and the additional PLA resin, are such that a high D PLA resin and a high L PLA resin each constitute at least 25% of the PLA resins; then
   b) extruding the mixture to form a thermoformable sheet, and
   c) thermoforming the sheet.

2. The process of claim 1 wherein, after step b), the thermoformable sheet is cooled to below the glass transition temperature of the PLA resins prior to conducting step c).

3. The process of claim 2 wherein step c) is conducted by c1) heating the thermoformable sheet to a temperature between the glass transition temperatures of the PLA resins and their highest crystalline melting temperature and c2) thermoforming the heated sheet on a mold.

4. The process of claim 3 wherein, prior to step c1) the sheet is pre-annealed at a pre-annealing temperature between the glass transition temperature of the PLA resin but not higher than 140° C. prior to thermoforming the sheet.

5. The process of claim 4 wherein the pre-annealing temperature is from 90 to 120° C.

6. The process of claim 4, wherein the pre-annealed sheet is quenched by cooling it below the glass transition temperatures of the PLA resins, prior to performing step c1).

7. The process of claim 4 wherein the pre-annealed sheet contains less than 5 J per gram of PLA resin of crystallites having a crystalline melting temperature of from 160 to 190° C., and a total crystallinity of not greater than 15 J per gram of PLA resin.

8. The process of claim 3 wherein step c1) is conducted at a temperature of from 121 to 150° C.

9. A process comprising
   a) forming a mixture of PLA resins in which a high D PLA resin constitutes from 25 to 75% by weight of the weight of the PLA resins and a high L PLA resin constitutes from 75 to 25% by weight of the PLA resins, and heating the mixture to a temperature above its highest crystalline melting temperature for a period of from about 5 minutes to 3 hours in the presence of a transesterification catalyst and then blending the resulting transesterified PLA resins with (1) an additional quantity of a high L PLA resin or high D PLA resin to form a blend provided that the proportions of PLA resins, including the starting PLA resins and the additional PLA resin, are such that a high D PLA resin and a high L PLA resin each constitute at least 25% of the PLA resins; then
   b) extruding the mixture to form a thermoformable sheet,
   c) heating the sheet to a temperature above its glass transition temperature but below 180° C. for a period of time sufficient to produce a semi-crystalline sheet having from 15 to 40 J per gram of PLA resin of crystallites that have a melting temperature of from 200 to 215° C. and then
   d) thermoforming the sheet.

10. The process of claim 9, wherein the sheet prior to thermoforming has a thickness of from 5 to 50 mils.

11. The process of claim 10, wherein the sheet is thermoformed on a mold that is at a temperature below the glass transition temperature of the PLA resin.

12. The process of claim 10, wherein the sheet is thermoformed on a mold that is at a temperature above the glass transition temperature of the PLA resin but not higher than 130° C.

* * * * *